United States Patent Office 3,141,882
Patented July 21, 1964

1

3,141,882
PROCESS FOR PREPARING FREE FLOWING FINELY DIVIDED CYANURIC CHLORIDE
Tilo Franz, Schwalbach, Taunus, Robert Richter, Hochkirchen, near Cologne, and Gerhard Bach, Wesseling, Germany, assignors to Deutsche Gold- und Silber-Scheideanstalt, Frankfurt am Main, Germany
No Drawing. Filed Aug. 29, 1961, Ser. No. 134,571
Claims priority, application Germany Aug. 31, 1960
1 Claim. (Cl. 260—248)

The present invention relates to an improved non-caking free flowing finely divided cyanuric chloride composition, a process for its preparation and its use in the production of amino chlorotriazines.

It is known that solid finely divided cyanuric chloride easily cakes and therefore causes difficulties upon storage and during subsequent processing.

According to the invention, it was unexpectedly found that excellent free flowing properties and excellent processing characteristics can be imparted to finely divided cyanuric chloride by the addition of small quantities of a finely divided inorganic oxide or silicate. An especially suited oxide is a silicon dioxide produced by conversion of a volatile silicon compound with an oxidizing or hydrolyzing gas at elevated temperatures in the gas phase. Such gas phase silicas are available commercially as the well-known trademarked products "Aerosil" and "Cabosil." Similarly good results can be obtained with titanium dioxide or aluminum oxide produced in an analogous gas phase relation. Also finely divided silicic acid or silicates, such as aluminum silicate or calcium silicate, produced by precipitation from aqueous solutions of alkali metal silicates are suitable to impart free flowing and non-caking characteristics to finely divided cyanuric chloride. The quantities of finely divided oxides or silicates required to render finely divided cyanuric chloride free flowing and non-caking is only about 0.3 to 3% by weight.

The finely divided oxides or silicates can be added to the previously produced finely divided cyanuric chloride. On the other hand, when the cyanuric chloride is produced by trimerization of cyanogen chloride in the gas phase, the required quantity of the oxide or silicate can be injected into the gas stream with the aid of an inert gas preferably shortly before the cyanuric chloride is condensed or separated off.

It was furthermore found that the free flowing non-caking cyanuric chloride composition according to the invention could be used with excellent success for the production of amino chlorotriazines. Amino chlorotriazines are produced by reacting cyanuric chloride with ammonia, primary or secondary amines in solvents, preferably in water. Amino chlorotriazines are useful as active substances for weed killers including such weed killers for selective eradication of weeds among cultivated plants as well as for total eradication or prevention of plant growth. Normally the caking characteristics of cyanuric chloride cause difficulties in the production of amino chlorotriazines therefrom. Often it was not possible to achieve a complete reaction with the result that the product had to be separated from unconverted cyanuric chloride. However, when the free flowing non-caking cyanuric compositions according to the invention are employed it is possible to carry out the reaction quantitatively.

*Example 1*

Some 100 kg. of cyanuric chloride are intimately mixed with 0.4% of Aerosil (finely divided silica). The caking cyanuric chloride is hereby transformed to a non-caking product.

*Example 2*

During the condensation of vaporized cyanuric chloride in the manufacture 1% of finely divided calcium silicate is continuously introduced by nitrogen in the vapor before injecting the vapor in the condensation chamber. The hereby obtained product is not caking.

We claim:

A method of producing a solid finely divided free flowing non-caking cyanuric chloride containing 0.3 to 3% of a finely divided inorganic substance selected from the group consisting of finely divided silicon dioxide, aluminum oxide, titanium oxide, silicic acid, calcium silicate and aluminum silicate intimately admixed therewith which comprises injecting the finely divided substance with the aid of an inert gas into a gas containing cyanuric chloride vapor distributed therein and condensing the cyanuric chloride vapor in contact with said injected finely divided substance to recover a solid free flowing non-caking cyanuric chloride containing 0.3 to 3% of the finely divided inorganic substance.

References Cited in the file of this patent

UNITED STATES PATENTS 2,882,254    Kloepfer et al. _____ Apr. 14, 1959

OTHER REFERENCES

Smolin et al.: s-Triazines and Derivatives, Interscience Pub. Inc., N.Y., 1959, page 55, QD 401 362.

Mullin: Crystallization, Butterworth and Co., 1961, page 184, QD 548 M7.